United States Patent [19]

Hurd et al.

[11] Patent Number: 5,163,669
[45] Date of Patent: Nov. 17, 1992

[54] PAPER FEED MECHANISM HAVING AN ADJUSTABLE RESTRAINER

[75] Inventors: Bruce E. Hurd, Oxford; Lawrence F. Eisner, Cheshire, both of Conn.

[73] Assignee: Bryce Office Systems, Inc., Oxford, Conn.

[21] Appl. No.: 689,330

[22] Filed: Apr. 23, 1991

Related U.S. Application Data

[63] Continuation-in-part of Ser. No. 596,040, Oct. 11, 1990, Pat. No. 5,094,554.

[51] Int. Cl.⁵ ............................................. B65H 3/52
[52] U.S. Cl. ..................................... 271/125; 271/121
[58] Field of Search .............. 271/121, 124, 125, 119, 271/165

[56] References Cited

U.S. PATENT DOCUMENTS

| | | | |
|---|---|---|---|
| 3,838,851 | 10/1974 | Kolibas | 271/124 |
| 4,316,606 | 2/1982 | Buys et al. | 271/125 X |
| 4,437,658 | 3/1984 | Olson | 271/125 |
| 4,728,095 | 3/1988 | Irvine et al. | 271/125 X |
| 4,858,907 | 8/1989 | Eisner et al. | 271/124 |
| 4,958,825 | 9/1990 | Onomoto et al. | 271/121 X |
| 4,991,831 | 2/1991 | Green | 271/125 X |

FOREIGN PATENT DOCUMENTS

| | | | |
|---|---|---|---|
| 3030489 | 3/1981 | Fed. Rep. of Germany | 271/121 |
| 235330 | 10/1986 | Japan | 271/125 |
| 36246 | 2/1987 | Japan | 271/124 |
| 258330 | 10/1988 | Japan | 271/125 |
| 43141 | 2/1990 | Japan | 271/121 |
| 132031 | 5/1990 | Japan | 271/121 |
| 209330 | 8/1990 | Japan | 271/121 |
| 2033348 | 5/1980 | United Kingdom | 271/125 |
| 8802734 | 4/1988 | World Int. Prop. O. | 271/125 |

OTHER PUBLICATIONS

Dials et al, "Roll Interference Adjustment Mechanism and Restraint Roll Idler Mechanism", Sep. 1985, IBM Tech Disclosure Bull., vol. 18, No. 4, p. 953.

Sokol, "Wear Compensation and Roll Gap Generator", Sep. 1975, IBM Tech. Disclosure Bulletin. vol. 18, No. 4, p. 957.

*Primary Examiner*—Donald T. Hajec
*Assistant Examiner*—Boris Milef, Jr.
*Attorney, Agent, or Firm*—Nixon & Vanderhye

[57] ABSTRACT

Letter quality addressing is possible at production speeds. A feeding and transport system positively feeds discrete media elements to be addressed (such as envelopes) past a number of print heads in a positive manner to maintain consistent and proper alignment of the printed text on the media elements. First and second feed rollers feed the media elements to a pair of pinch rollers, the operation of the first roller being interrupted once a media element reaches a predetermined position. A normally non-rotatable selector bar with O-rings mounted at axially spaced positions therealong are associated with the second feed roller. An adjustment mechanism is provided for not only adjusting the selector bar relative the second feed roller to accommodate media of different thickness, but also to adjust the position of the O-rings relative to the second feed roller.

11 Claims, 6 Drawing Sheets

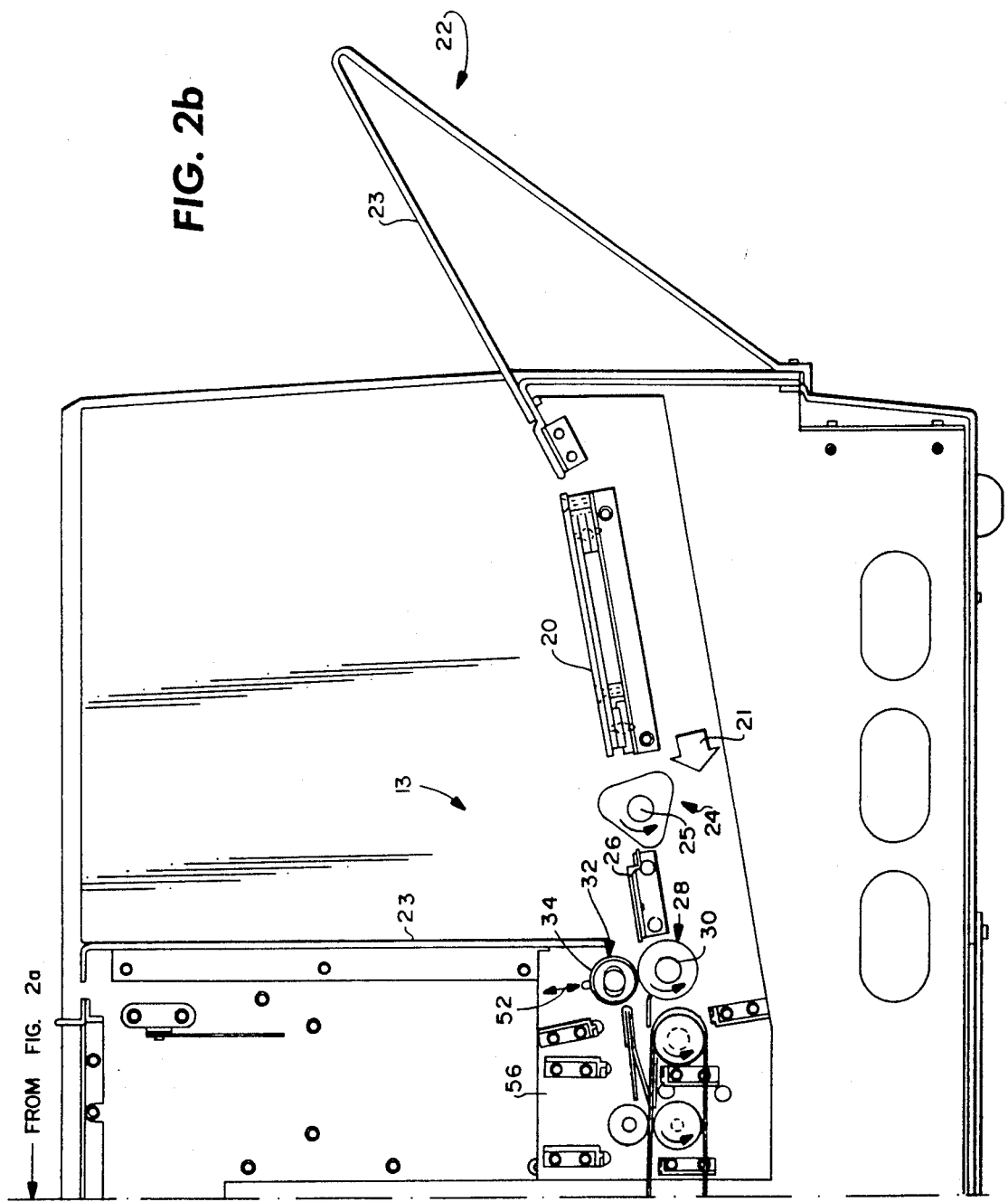

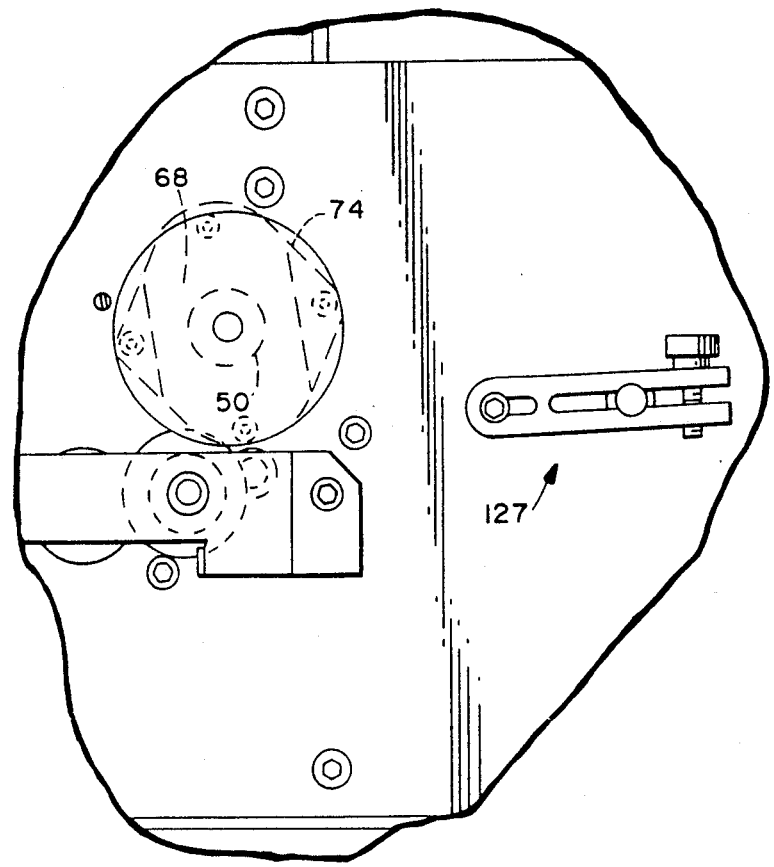
FIG. 5
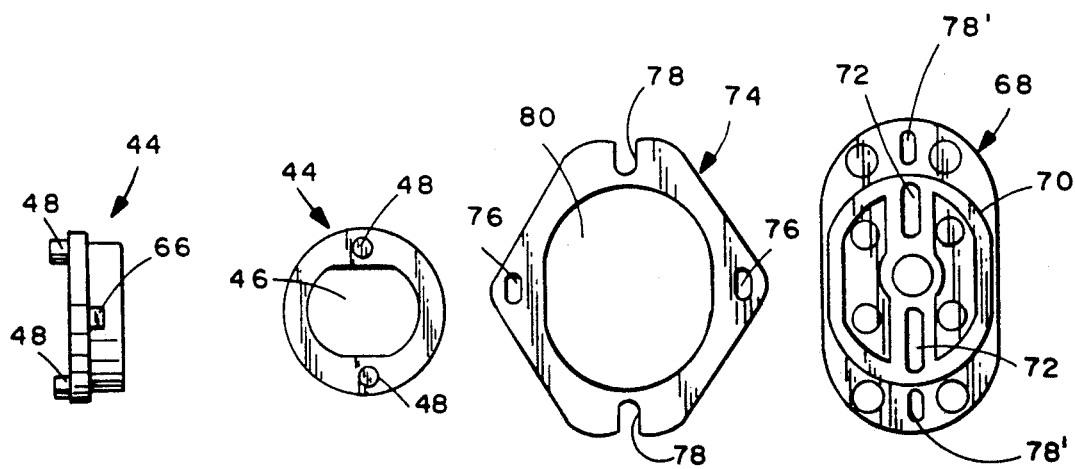
FIG. 6a  FIG. 6b  FIG. 6c  FIG. 6d

PAPER FEED MECHANISM HAVING AN ADJUSTABLE RESTRAINER

RELATED APPLICATIONS

This application is a continuation-in-part of application Ser. No. 07/596,040 filed Oct. 11, 1990 now U.S. Pat. No. 5,094,554, which application is incorporated in its entirety herein by reference.

BACKGROUND AND SUMMARY OF THE INVENTION

There is a substantial need for machines that are capable of high speed, high quality addressing of discrete media elements, such as envelopes, cards, flats, newspapers, or the like. When media elements are directly printed rather than having address labels applied thereto, they present a much better appearance. The appearance alone may be the difference between a recipient discarding the media without even examining it carefully, or responding to the media element. The quality nature of the print also is important in order minimize postage since the printing of bar codes on media (which must be printed in a high quality manner to be effective) speeds delivery of the media and may significantly reduce postage.

According to the present invention, machinery is provided which is capable of providing high speed, high quality addressing. Utilizing the machine according to the present invention, it is possible to print near letter quality media elements at up to 10,000 per hour, and letter quality elements at up to 6,000 per hour. The media handled can be anything from 3×5 inches up to 12¼×24 inches and from less than 0.007 to 0.125 of inch thick. The print area may be adjusted within a wide range so that it is properly positioned on the media, depending upon the size and composition of the media, and is capable of printing a complete address, including the postal bar code.

The desirable results are achieved according to the invention by utilizing ink jet printers which are positioned above transport belts which move the media therepast at a high speed. The ink jet printers are mounted so that the orifices thereof will not be clogged by rebounding ink particles, yet there is no necessity for a wiper for wiping ink particles off of the print heads. The feeding and transporting system in a machine according to the invention positively feeds each of the individual media elements to and past the print heads in a precisely controlled manner so that the printing is in a uniform position on the media elements, and so that there is no slippage between the media elements and the transport mechanisms that could otherwise cause blurring or other non-uniformities in the printing quality.

Media elements are fed from a substrate by first and second feed rollers to a pair of pinch rollers and then onto a plurality of endless transport belts having transport wipers holding the edges of the media elements in positive contact with the transport belts. The first feed roller feeds the media element to the second feed roller, which in turn feeds the media element to the pinch rollers. Once the media element is between the second feed roller and the pinch rollers, operation of the first roller is terminated to ensure no double feeding. A selector bar — the position of which is adjustable with respect to the second feed roller in order to accommodate media of different thickness — is positioned above the second feed roller and, in parent application Ser. No. 07/596,040, has an abrasive strip thereon which will engage the media elements and ensure singulation thereof to the second feed roller.

In accordance with this continuation-in-part application, a plurality of O-rings are mounted in axially spaced positions along the selector bar and protrude radially into correspondingly located, mating grooves formed axially along the second feed roller. This new feeder arrangement operates in two modes. For thicker media, it operates in a very similar manner to the feeder disclosed in the above identified parent application, as well as in commonly assigned U.S. Pat. No. 4,858,907 (the totality of which is also incorporated herein by reference). In other words, the O-rings perform essentially the same function as the abrasive strip in that they hold back the leading edge of the piece of media next to the bottom of the stack while the bottom piece is fed.

For very thin media, however, the O-rings perform in a superior manner in comparison to an abrasive strip. This is particularly true with respect to media even thinner than the thinnest media that the U.S. Postal Service will accept (0.007 inch). Generally, once two or more pieces of media have simultaneously passed the abrasive strip, all will be fed, and here is where the second mode of operation of the O-ring arrangement has its greatest beneficial effect. When the selector bar containing the O-rings is adjusted downward toward the grooved rubber feed roller beneath it, a series of bends are set up across the width of the media being fed. The associated retarding friction between the O-rings and the piece of media which is next to the bottommost piece is greater than the friction holding the two pieces together. The driving friction between the feed roller and the bottom piece of media is also greater than the friction holding the bottom two pieces together. As a result, the bottom piece is fed by itself and the next piece is held back by the O-rings.

The remainder of the machine construction is as described in parent application Ser. No. 07/596,040, to which reference is made for a complete understanding thereof.

In accordance with this continuation-in-part application, therefore, the present invention comprises, in its broader aspects, a feed control system for feeding printable sheets into a printer, the system including a sheet feed bin having an opening therein and a feed roller positioned in the opening, the improvement comprising: a normally non-rotatable selector bar located above the feed roller defining a sheet gate therebetween, the selector bar having a plurality of resilient, annular rings axially spaced therealong for frictionally engaging and holding back a sheet stacked on an underlying sheet being fed.

In another aspect, the invention relates to an envelope feed control system for feeding envelopes into a printer, the system including an envelope feed bin, the bin including a bottom surface sloping downwardly in the direction of desired feed and an end wall extending vertically above the lower end of the bottom surface, the bottom surface including an opening therein proximate to the lower end, a feed roller positioned in the opening, the feed roller having a plurality of peripheral grooves axially spaced therealong; a non-rotatable, unitary, rounded control surface below the end wall and above the feed roller, the control surface and the feed roller defining an envelope gate, the gate being dimensioned to permit passage of one envelope at a time, and the control surface having a plurality of resilient friction rings thereon, the friction rings located to protrude into corresponding ones of the peripheral grooves in the feed roller, whereby envelopes may be fed singly through the gate and the envelope above the one being fed will be prevented from moving by frictional engagement with the plurality of O-rings.

Additional objects and advantages of the invention will become clear from an inspection of the detailed description of the invention, and from the appended claims.

BRIEF DESCRIPTION OF THE DRAWINGS

FIGS. 2a and 2b together comprise a side view (with the cover of the machine removed) of internal components of the machine of FIG. 1;

FIG. 5 is a side view of detailed components associated with the selector bar and second feed roller of the apparatus of FIGS. 1–4;

FIG. 6a is a side view of an end cap component used with the selector bar of FIG. 3;

FIG. 6b is a front view of the end cap shown in FIG. 6a;

FIGS. 6c and 6d are front views of a locating plate and access plate, respectively, used with the selector bar of FIG. 3;

DETAILED DESCRIPTION OF THE DRAWINGS

Figure 1:
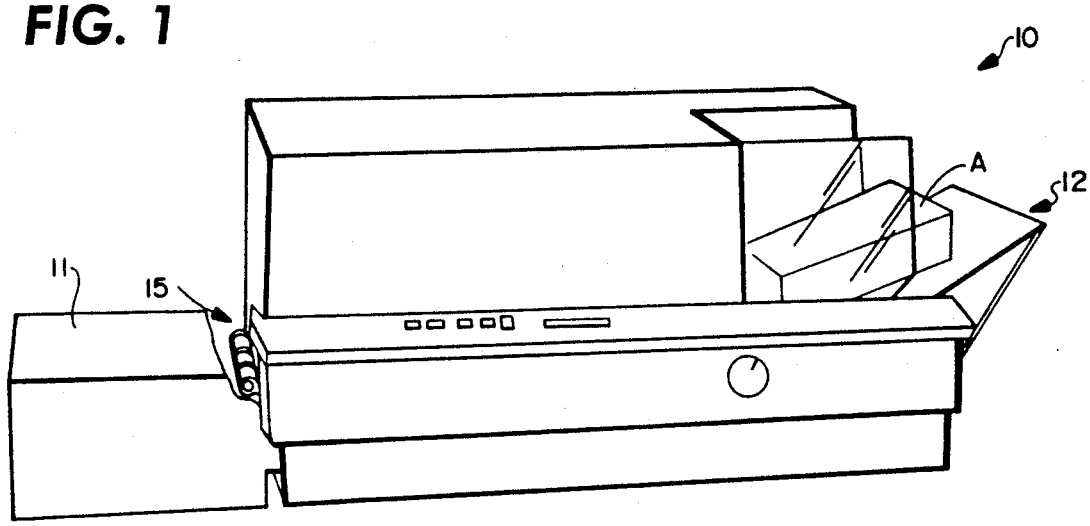
FIG. 1 is a perspective exterior view of an exemplary machine according to the present invention.
Figure 2A:
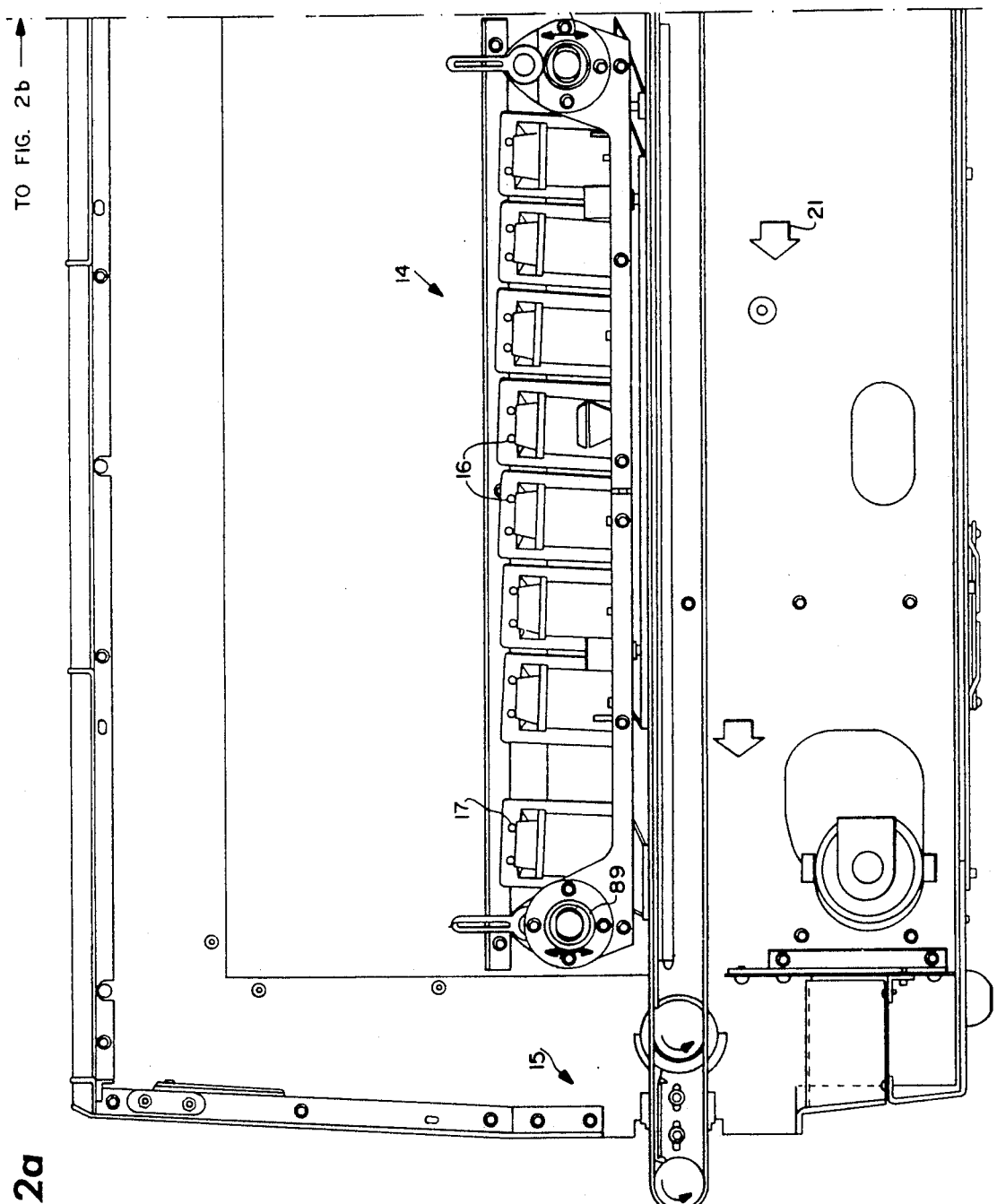

An exemplary machine according to the present invention is shown generally by reference numeral 10 in FIGS. 1 and 2. The machine 10 is preferably adapted to be used with a catch tray 11, or a conveyor (FIG. 1). Media elements A (see FIG. 1) to be addressed are fed in at the entry end 12 of the machine 10, are engaged by the feeding means 13 to be fed to the transport means 14, and ultimately discharged from the exit end 15 of the machine 10. The transport means 14 moves the discrete media elements past a plurality of print heads, such as a first group of print heads 16, and a separate print head 17 (see FIGS. 2 and 4). The positions of the heads 16 may be adjusted with eccentric screws as described in the parent application.

The media elements A may comprise envelopes, cards, flats, or newspapers, or the like. Typically, the media elements may have size ranging from 3×5 inches up to 12¼×24 inches, with a thickness of from about 0.007 to about 0.125) inch.

At the inlet end 12 of the machine 10 a substrate 20 is provided upon which the media to be printed rests. Exteriorly of the substrate 20 (that is upstream thereof in the direction of the media transport 21) is a bin extension 22, having a support surface 23 thereof that makes an angle with respect to the substrate 20 so as to be effective to take some of the weight of the stack media elements off the bottom element which engages the substrate 20. The substrate 20 cooperates with the feed wall 23 against which the leading edges of the media elements are stacked.

Adjacent the substrate 20 in the direction of transport 21 is a first or upper feed roller 24 which preferably has a non-circular (e.g., rounded apex triangle) cross-sectional configuration, and it is rotatable about a shaft 25 extending in a horizontal dimension essentially transverse to the direction of transport 21. The direction of transport 21 preferably is also horizontal. The shaft 25 is connected to a clutch (not shown) which, in turn, is connected to a motor (also not shown) as described in detail in the parent application.

Downstream of the first feed roller 24 in the direction of transport 21 is the support surface 26, and then next to that a second or lower feed roller 28. The roller 28 is mounted for rotation about shaft 30, the shaft 30 being parallel to the shaft 25 and perpendicular to the direction of transport 21. The shaft 30 is connected up to a second clutch (not shown) distinct from the first clutch, but powered by the same motor.

Figure 4:
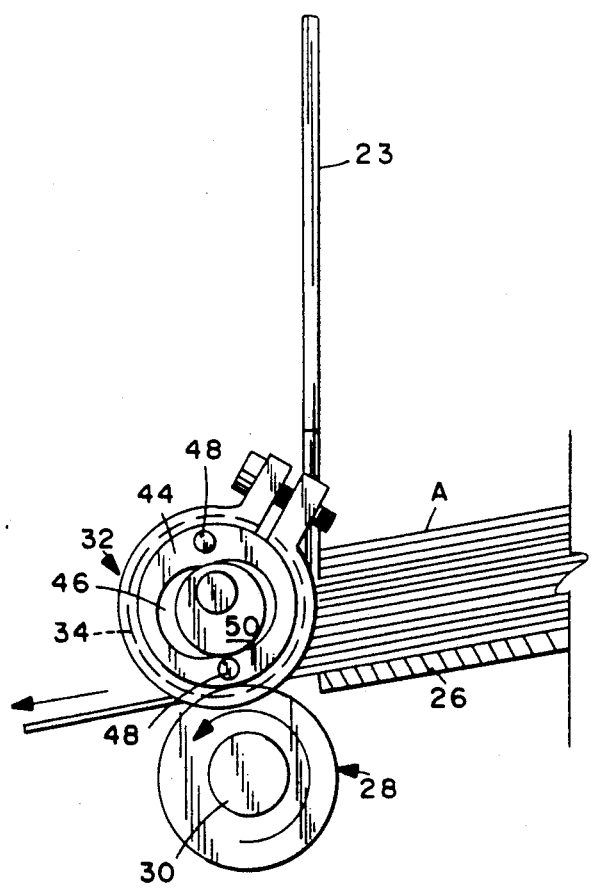
FIG. 4 is an enlarged end view of the selector bar and cooperating feed roller shown in FIG. 3 with the further addition of a stack of media to be fed.
Figure 3:
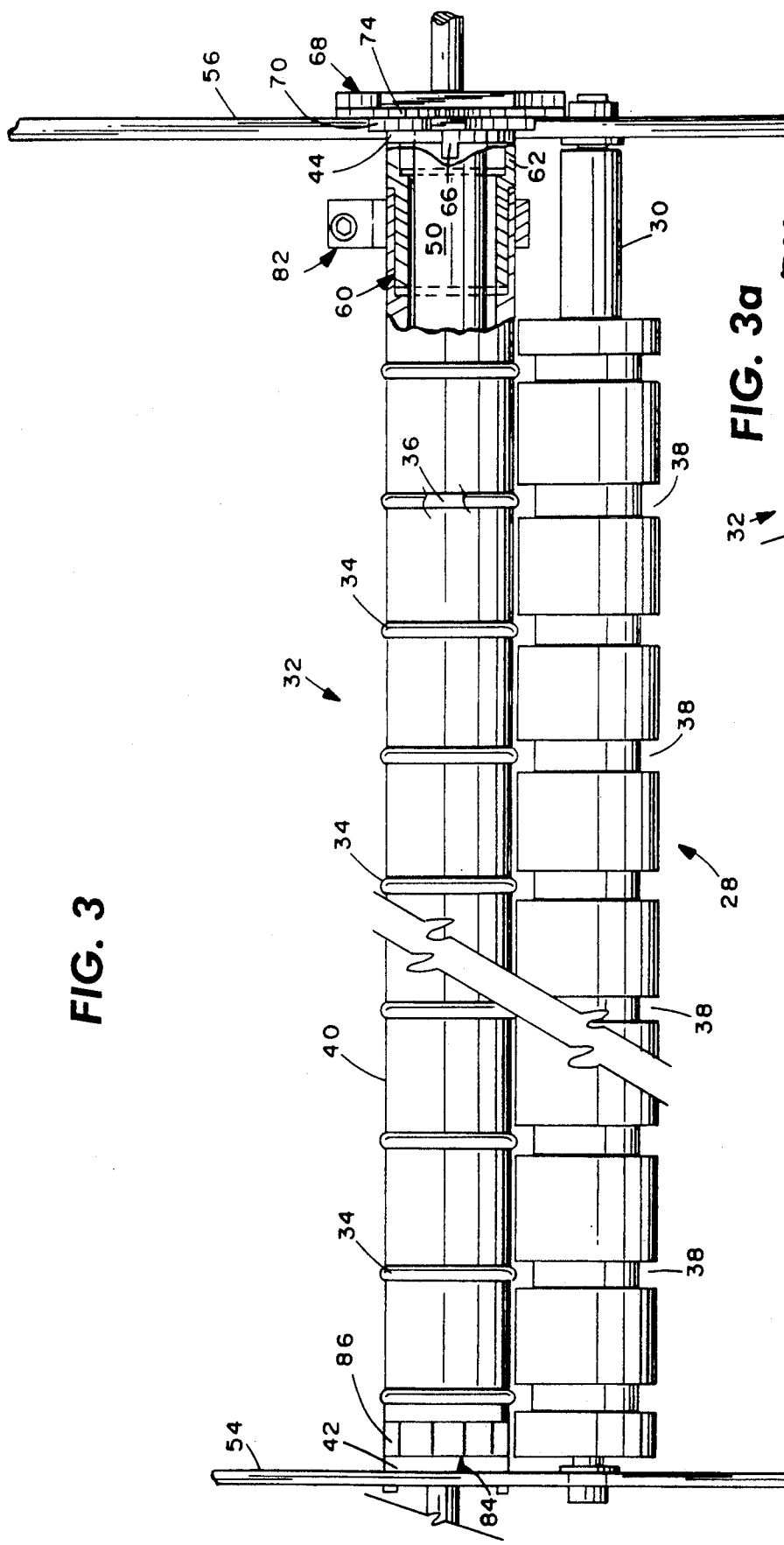
FIG. 3 is a front view of a selector bar and cooperating feed roller in accordance with this invention and of the type incorporated in the machine shown in FIGS. 2a and 2b with other parts removed for the sake of clarity.

Mounted above the second feed roller 28 in operative association therewith is a selector bar 32. The selector bar 32 does not rotate, but rather provides a stationary guide for singulating the media elements A during guiding of the media elements from the surface 26 into operative association with the rotating periphery of the second feed roller 28. To facilitate this guiding function, the selector bar 32 has a plurality of resilient, annular friction rings, e.g., rubber O-rings 34, spaced axially along the outer periphery thereof in relatively shallow grooves 36 formed in the exterior surface of the selector bar, as best seen in FIGS. 3 and 4. The O-rings 34 are positioned just above the topmost rotating portion of the circumference of the feed roller 28. The manner in which this positioning is accomplished is explained below. Feed roller 28 is formed with a like number of peripheral grooves 38 correspondingly axially spaced along the feed roller 28 so as to receive the radially protruding O-rings 34.

Since the engaged portions, i.e., rounded control surfaces, of the O-rings 34 will eventually wear (forming a flat spot, for example), an arrangement is provided which permits the selector bar to be rotated about its axis so that unused segments of the O-rings can be located to face the feed roller, allowing this improved feed mechanism to last four to five times longer than the previously disclosed selector bar before the expendable elements, i.e., the O-rings, need replacement.

The selector bar 32 preferably comprises an outer tubular component 40 which has a pair of end caps 42, 44, each having an elongated slot 46 and a pair of diametrically opposed guide pins 48, the width of the slot 46 sized to snugly receive an interior, eccentric shaft assembly 50 which, when rotated, effects movement of the bar 32 toward or away from the second feed roller 28 in dimension 52 (see FIG. 2). In this regard, the selector bar 32 is confined to substantially vertical movement by reason of the sliding engagement of pins 48 within substantially vertical slots provided within vertical slots in the machine plate 54 on the left side of the selector bar (FIG. 3), and within vertical slots in an access plate mounted to the machine plate 56 on the right hand side of the selector bar. This mounting arrangement allows adjustment of the spacing between the bar 32 and the second feed roller 28 to accommodate media elements A of different thicknesses, e.g., from extremely thin paper sheets less than 0.007 inch thick, to newspapers up to 0.125 of an inch thick.

Figure 3A:
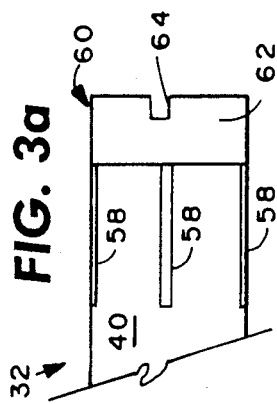
FIG. 3a is a partial front view of the selector bar shown in FIG. 3.

With reference especially to FIG. 3a, the right hand end of selector bar tube 40 is formed with four axially extending slits 58 spaced equally about the circumference of the tube, and received over a stepped diameter adjustment insert 60 which, in turn, receives the end cap 44. The slit configuration allows the selector bar to be tightly clamped to the adjustment insert as described further below. The larger diameter end 62 of the adjustment insert 60 is provided with two, diametrically opposed notches 64 (one shown in FIG. 3a) which are designed to receive a corresponding pair of anti-rotation tabs 66 formed on the end cap 44.

With reference now to FIGS. 3, 5 and 6, machine plate 56 is formed with an aperture for receiving the selector bar mounting apparatus. Specifically, an access plate 68 of generally elliptical or rounded elongated shape is provided with a similarly shaped projecting portion 70, the inside face of which includes vertically aligned elongated slots 72 which receive the guide pins 48 of end cap 44, thereby permitting the cap 44 and selector bar 32 to move towards and away from second feed roller 28 via rotation of the shaft assembly 50 as described above.

Between the access plate 68 and outer surface of the machine, there is a relatively thin locator plate 74 having an aperture 80 shaped to receive projecting portion 70 of plate 68. Machine plate 56 has an identical aperture to receive projecting portion 70 of plate 68. The access plate 68 is held to the front surface of machine plate 56 with two screws passing through slots 78' and slots 78 of the locator plate 74. The locator plate 74 is fastened to the front surface of machine plate 56 with two screws passing through slots 76. Engagement of guide pins 48 of end cap 44 with slots 72 of access plate 68 and engagement of anti-rotation tabs 66 of end cap 44 with the notches 64 in adjustment insert 60 prevent relative rotation between access plate 68, end cap 44 and adjustment insert 60.

As described above, the mounting arrangement permits vertical movement of the selector bar 32 upon rotation of shaft assembly 50, but prevents relative rotation between adjustment insert 60, end cap 44 and access plate 68 on the one hand, and locator plate 74 and machine plates 54, 56 on the other. By removing the access plate 68, the selector bar 32 (with end cap 44) may be slidably removed from the machine for maintenance and/or replacement. Locator plate 74 will remain fixed to the machine plate 56 to insure proper parallel alignment (relative to feed roller 28) of the selector bar upon reassembly.

The end cap 42 on the left hand side of the selector bar 32 as viewed in FIG. 3 is also provided with guide pins (not shown) but without the anti-rotation tabs 66. This arrangement permits relative rotation between the selector bar 32 and end cap 42 for the purpose described below.

A conventional locking collar or clamp 82 is slidably received over the tubular component 40 to a position where it overlies slits 58 of the tube and the adjustment insert 60. By the above described arrangement, locking collar 82, when tightened, prevents any rotation of selector bar 32 relative to end caps 42, 44 and adjustment insert 60, while allowing vertical movement of the selector bar assembly via rotation of shaft assembly 50 for the purpose of adjustment toward or away from feed roller 28. The collar 82 may be loosened, however, and selector bar 32 may then be rotated relative to end caps 42, 44 as well as the adjustment insert 60 so that fresh or unused portions of the O-rings 34 can be rotated to a position adjacent the second feed roller 28.

To assist in determining the extent of rotation of the selector bar 32 necessary to present a completely new portion of the O-rings 34 to the feed roller 28, a permanent indicator 84 is provided on the end cap 42. At the same time, scale markers 86 are provided on the tubular portion 40, the distance between adjacent scale markers corresponding to the amount of rotation required to present fresh portions of the O-rings 34 to the feed roller 28.

The remainder of the machine is as described in parent application Ser. No. 07/596,040 and need not be described further herein.

In operation, a stack of envelopes (media A) is placed on the support surfaces 20, 26 and extension 23, and the machine is started. The motor driven clutches cause feed rollers 24, 28 to start rotating, and the bottom envelope in the stack is engaged by the first feed roller 24 and driven in the transport direction 21, so that it impacts the O-rings 34 on selector bar 32, and moves into contact with the upper rotating surface of the second feed roller 28.

Figure 7:
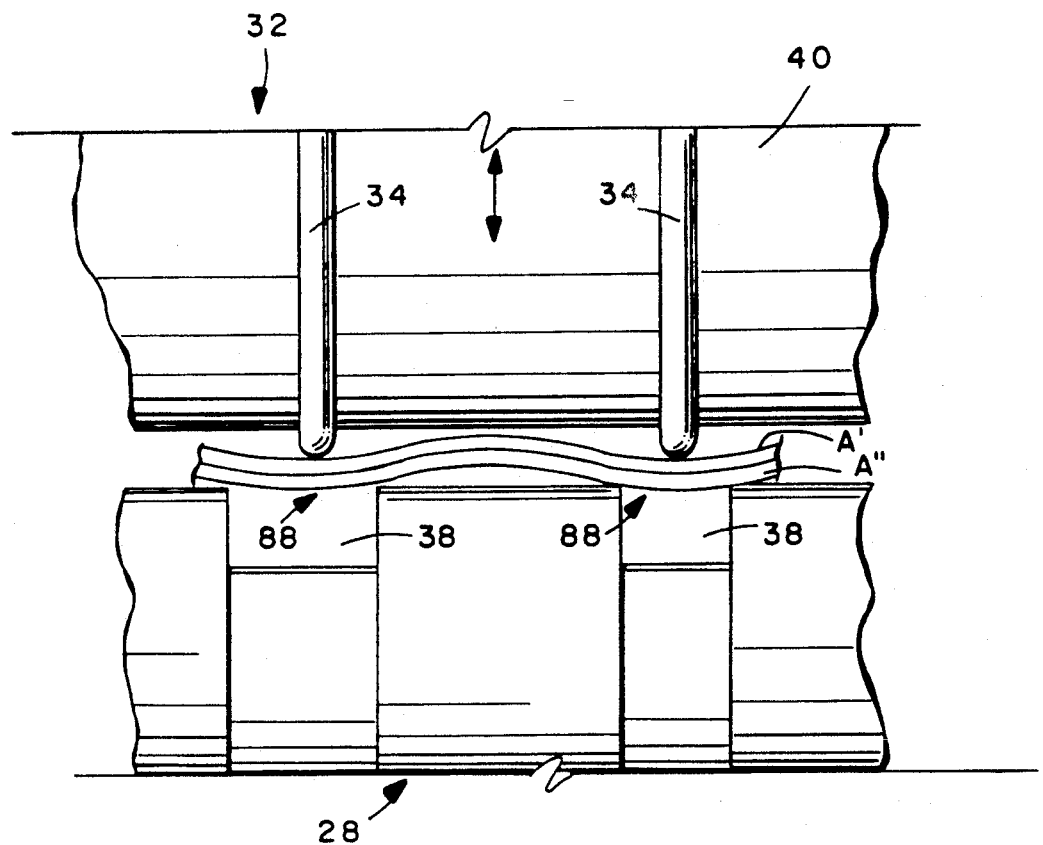
FIG. 7 is an enlarged partial front view of a portion of the selector bar and feed roller illustrated in FIG. 3 with thin media being fed therebetween.

Referring to FIG. 7, and when very thin media A', A" is being fed through the device, the selector bar 32 is adjusted downwardly toward the grooved second feed roller 28 so that a series of bends 88 are created across the width of the media being fed as indicated in FIG. 7, by reason of the cooperation of O-rings 34 and grooves 38. Associated retarding friction between the O-rings 34 and the piece of media A' next to the bottommost piece of media A" is greater than the friction holding the two pieces of media A', A" together. The driving friction between the feed roller 28 and the bottom piece of media A" is also greater than the friction holding the bottom two pieces A', A" together. Accordingly, the bottom piece A" is fed by itself and the next piece A' is held back by the O-rings 34.

Figure 8:
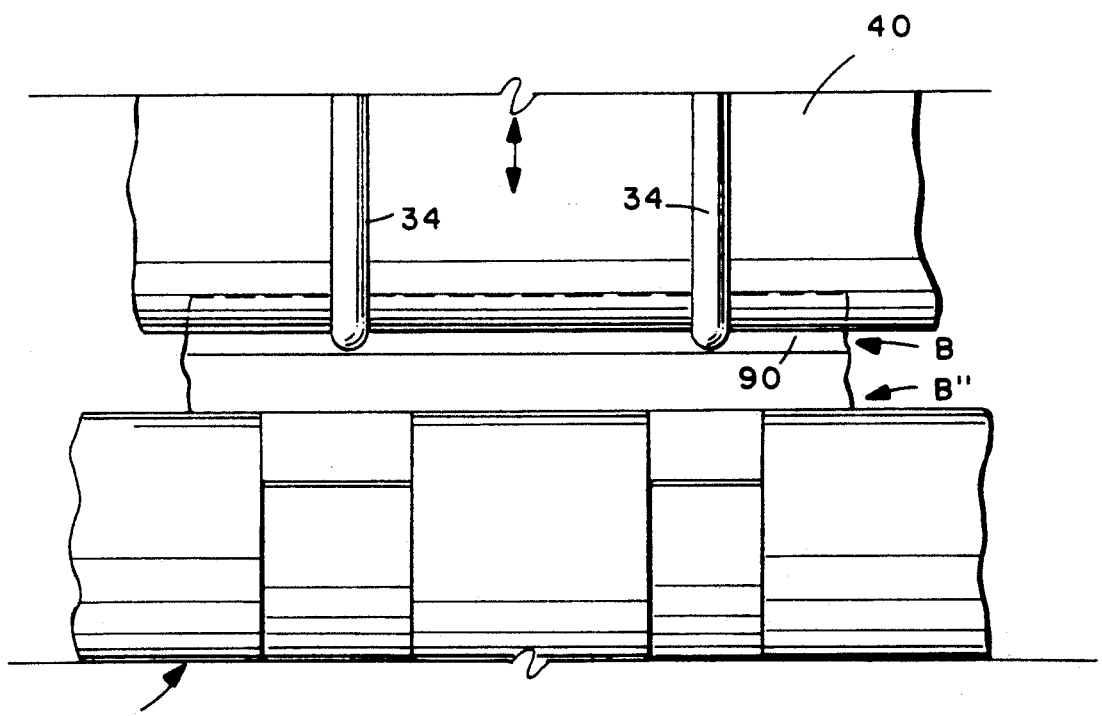
FIG. 8 is an enlarged partial front view of a portion of the selector bar and cooperating feed roller illustrated in FIG. 3 but with thicker media being fed therebetween.

In the event relatively thick media B, B' is being fed through the device as indicated in FIG. 8, the O-rings 34 hold back the leading edge 90 of the piece of media B next to the bottom of the stack while the bottom piece B' is fed to the feed roller 28.

It will thus be seen that according to the present invention a printing assembly for printing discrete media elements has been provided which allows high-speed, high-quality addressing. While the invention has been herein shown and described and was presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A feed control system for feeding sheets to a printer, comprising:

a feed roller adapted to engage a lower surface of a sheet to be fed;

a normally non-rotatable selector bar located above said feed roller for insuring that the sheets pass between said selector bar and said feed roller, one at a time;

wherein said selector bar includes a pair of end caps at either end thereof, one of said end caps permitting relative rotation between the selector bar and said one of said end caps; and, a plurality of friction components located on said selector bar at axially spaced positions therealong and adapted to engage a surface of a sheet to be held back above said sheet to be fed.

2. The feed control system according to claim 1 wherein said friction components are of annular construction and wherein adjustment means are provided for rotating said selector bar to present different portions of said friction components for cooperation with said feed roller.

3. The feed control system according to claim 2 wherein said friction components project radially from said selector bar, and said feed roller is provided with a plurality of axially spaced, circumferential grooves for receiving respective portions of said friction components.

4. The feed control system according to claim 2 and further including means for indicating movement of said selector bar in response to operation of said adjustment means.

5. The feed control system according to claim 3 and including eccentric means for moving said selector bar toward or away from said feed roller in response to rotation of a shaft.

6. The feed control system of claim 1 wherein the other of said end caps prevents relative rotation between the selector bar and the other of the end caps.

7. The feed control system of claim 6 wherein said other of said end caps is received within an adjustment insert slidably received in one end of said selector bar.

8. The feed control system of claim 7 wherein means are provided for locking said one end of said selector bar to said adjustment insert.

9. The feed control system of claim 1 wherein said friction components and said feed roller are capable of single feeding sheets with a thickness less than 0.007 inch.

10. The feed control system of claim 9 wherein said friction components and said feed roller are capable of single feeding sheets with a thickness up to about 0.125 inch.

11. In a feed control system for feeding printable sheets into a printer, the system including a sheet feed bin having an opening therein and a feed roller positioned in said opening, the improvement comprising:

a normally non-rotatable selector bar located above said feed roller defining a sheet gate therebetween, said selector bar formed with a plurality of axially spaced grooves on which are seated a corresponding plurality of resilient, annular friction rings axially spaced therealong, at least a portion of said rings extending radially beyond the selector bar for frictionally engaging and holding back a sheet stacked on an underlying sheet being fed;

wherein means are provided for rotating said selector bar to present a different portion of said resilient annular rings to said grooves in said feed roller; and wherein said means for rotating comprises a split sleeve portion of said selector bar receivable over a relatively stationary insert, and a locking collar for loosening or locking said selector bar relative to said insert.

* * * * *